3,148,048
SYNERGISTIC HERBICIDAL COMPOSITION
Jack S. Newcomer, Wilson, Edward D. Weil, Lewiston, and Edwin Dorfman, Grand Island, N.Y., assignors to Hooker Chemical Corporation, Niagara Falls, N.Y., a corporation of New York
No Drawing. Filed Mar. 11, 1959, Ser. No. 798,595
3 Claims. (Cl. 71—2.6)

This invention relates to a synergistic herbicidal composition. More specifically this invention resides in a novel herbicidal composition comprising 2,3,6-trichlorophenylacetic acid and N-phenyl-N',N'-dialkylurea herbicides. This application is a continuation-in-part of copending application Serial Number 692,046, filed in the United States Patent Office on October 24, 1957, now abandoned.

The herbicidal mixtures of this invention possess new and unobvious properties not logically predictable from the individual activities of the ingredient compounds. The surprising effect of this mixture is that the ingredient compounds enhance the effect of each other. Thus, applicants have found that the composition of this invention is much more herbicidally active than would be expected on the basis of the additivity of the two ingredient compounds.

As an herbicide, it is particularly useful in places where it is undesirable to have plant growth such as along railroad right of ways, highway guard rails, golf courses, pipelines, etc. Soil sterilization of this type in the prior art has been quite costly and a major need exists for soil sterilants which are effective and yet economical. The composition of this invention because of the desirable activities of its components and because of the large degree of synergism between the two compounds provides such a sterilant.

2,3,6-trichlorophenylacetic acid alone not only controls the weeds present at the time of application, but it has a high residual effect in controlling the emergence of weeds from the soil over considerable periods of time ranging up to two years after application, depending on the rates of application. The N-phenyl-N',N'-dialkylureas have been well-known herbicides in the agricultural field. Combinations of 2,3,6-trichlorophenylacetic acid or its derivatives with N-phenyl-N',N'-dialkylureas are far more herbicidally active than would be expected on the basis of additivity. Instead of 2,3,6-trichlorophenylacetic acid, one may employ various derivatives thereof which are equivalent thereto. The derivatives included in this invention are listed in copending application Serial Number 730,051, filed in the United States Patent Office on April 22, 1958. The rates, however, for convenience sake will be given throughout this disclosure in terms of the acid. The term N-phenyl-N',N'-dialkylurea herbicides employed herein encompasses the class of closely related commercial herbicides comprising N - phenyl - N',N' - dimethylurea, N-(3,4-dichlorophenyl) - N',N'-dimethylurea, N-(p-chlorophenyl)-N',N' - dimethylurea, N - (3,4-dichlorophenyl)-N',N'-dimethylurea, and N-n-butyl-N'-(3,4-dichlorophenyl)-N-methylurea. The common names for these herbicides (see Report of the Terminology Committee, Weed Society of America, published in Weeds, vol. 6, No. 1, January 1958) are "fenuron," "monuron," "diuron," and "neburon" respectively. It is preferred to use the composition of this invention in aqueous solutions, or as dry solids. Solid carriers such as clay, a borate mineral or vermiculite may also be included when the dry formulation is used. Formulations may contain emulsifying agents, such as sorbitol laurates, wetting agents, and carriers in accordance with the well-established practices in the herbicidal field. Combinations of this herbicide with other known herbicides which may or may not be involved in the synergistic effect may be used without departing from the spirit of this invention.

The synergism between 2,3,6-trichlorophenylacetic acid and the N-phenyl-N',N'-dialkylureas has been observed to be greatest at ratios of 1:2 to 2:1 and to become progressively less effective at ratios to either side of the above range. From 4:1 to 1:4 is a useful range of ratios for N-phenyl-N',N'-dimethylurea to 2,3,6-trichlorophenylacetic acid. It would not, however, deviate from the spirit of this invention to use any combination of components desired for a particular need. For economic reasons we prefer to employ the N-phenyl-N',N'-dialkylurea and the 2,3,6-trichlorophenylacetic acid at rates of one to forty pounds per acre of each component.

The following examples will further illustrate the present invention.

*Example 1*

A representative formulation of the composition of the invention is the following:

|                                                    | Parts by weight |
|----------------------------------------------------|-----------------|
| N-(p-chlorophenyl)-N',N'-dimethylurea              | 40              |
| 2,3,6-trichlorophenylacetamide                     | 40              |
| Attapulgus clay                                    | 15              |
| Marasperse (a commercial dispersing agent)         | 2.5             |
| Sorbit-P (a commercial wetting agent)              | 2.5             |

The ingredients are ground together to pass a 300 mesh screen, yielding a powder which can be readily dispersed and suspended in water by mild agitation.

*Example 2*

A useful formulation of the composition of this invention is as follows:

|                                                 | Parts by weight |
|-------------------------------------------------|-----------------|
| Sodium 2,3,6-trichlorophenylacetate             | 160             |
| N-(p-chlorophenyl)-N',N'-dimethylurea           | 80              |
| Attapulgus clay                                 | 18              |
| Marasperse                                      | 2               |

The ingredients are ground to make a powder which partially dissolves and partially suspends in water.

*Example 3*

Similar to Example 2 but with N-(3,4-dichlorophenyl)-N',N'-dimethylurea.

*Example 4*

The following example ilustrates the synergistic effect of the compositions of this invention.

A test area in Erie County, New York, infested with quackgrass, wild carrot, chicory, dock, ragweed, plantain, oxalis, daisy, yarrow, foxtail, hedge bindweed, and mustard was sprayed with an aqueous suspension of the type described in the foregoing examples. One year later, the treated area was inspected for weed control.

| Chemical | Pounds per acre required to accomplish soil sterilization |
|---|---|
| 1. 2,3,6-trichlorophenylacetamide | 20–40. |
| 2. Sodium 2,3,6-trichlorophenylacetate | 20. |
| 3. N-(p-chlorophenyl)-N',N'-dimethylurea | 10. |
| 4. Sodium 2,3,6-trichlorophenylacetate plus N-(p-chlorophenyl)-N',N'-dimethylurea. | 5 plus 2.5 or 2.5 plus 5. |
| 5. 2,3,6-trichlorophenylacetamide plus N-(p-chlorophenyl)-N',N'-dimethylurea. | 5 plus 2.5. |

Neither N-(p-chlorophenyl)-N',N' - dimethylurea nor 2,3,6-trichlorophenylacetic acid (as salt or amide) acted as soil sterilants at 2.5 to 5 pounds per acre. Nor did the parted degree of weed control given by such low rates of the individual compounds approximate to one-half the control given by the compositions of the invention.

Example 5

A test area in Niagara County, New York, infested with a rank growth of plantain, teasel, chicory, goldenrod, and wild carrot was treated in late spring with the test chemicals in formulations as described in Examples 1 and 2. In the succeeding fall the plots were inspected, with the following observations:

| Chemical | Pounds per acre required to accomplish soil sterilization |
| --- | --- |
| 1. 2,3,6-trichlorophenylacetamide | Above 40. |
| 2. N-(p-chlorophenyl)-N',N'-dimethylurea | 20. |
| 3. 2,3,6-trichlorophenylacetamide plus N-(p-chlorophenyl)-N',N'-dimethylurea. | 10 plus 5 respectively. |

The required rates in this experiment were observed to be generally higher than in the experiment of Example 4. This is understandable in that the weed infestation involved was of much larger establishment, with ranker and more deeply rooted growth.

The examples of the composition of our invention and methods of preparing and utilizing them, which have been described in the foregoing specification, have been given for purposes of illustration, not limitation. Many other modifications and ramifications will naturally suggest themselves to those skilled in the art, based on the disclosure of our basic discovery. These are intended to be comprehended within the scope of our invention.

We claim:

1. A herbicidal composition comprising from one to forty parts of 2,3,6-trichlorophenylacetic acid and at least from one to forty parts of a compound selected from the group consisting of N-phenyl-N',N'-dimethylurea, N-(p-chlorophenyl)-N',N'-dimethylurea, N-(3,4-dichlorophenyl)-N',N'-dimethylurea, and N-(3,4-dichlorophenyl)-N-methyl-N-butylurea said components being present in such amount as to exert herbicidal activity.

2. The herbicidal composition of claim 1 where the ratio of the N-phenyl-N',N'-dimethylurea to the 2,3,6-trichlorophenylacetic acid is from 4:1 to 1:4.

3. A method for controlling weeds which comprises applying per acre of ground to be treated a composition containing from 1 to 40 pounds of 2,3,6-trichlorophenylacetic acid and from 1 to 40 pounds of a compound selected from the group consisting of N-phenyl-N,N'-dimethylurea, N-(p-chlorophenyl)-N',N'-dimethylurea, N-(3,4-dichlorophenyl)-N',N'-dimethylurea, and N-3,4-dichlorophenyl-N'-methyl-N'-n-butylurea.

References Cited in the file of this patent

UNITED STATES PATENTS

| 2,444,905 | Sexton | July 13, 1948 |
| 2,709,648 | Ryker et al. | May 31, 1955 |
| 2,977,212 | Tischler | Mar. 28, 1961 |

OTHER REFERENCES

Johnson et al. in "Proceedings, Northeastern Weed Control Conference," January 9, 1959, pages 460–470 inclusive.